US005235752A

United States Patent [19]

Sauerwein et al.

[11] Patent Number: 5,235,752

[45] Date of Patent: Aug. 17, 1993

[54] RIVING KNIFE DRIVE MECHANISM FOR A PORTABLE CIRCULAR SAW

[75] Inventors: William D. Sauerwein, Phoenix; William R. Stumpf, Kingsville, both of Md.

[73] Assignee: Black & Decker Inc., Newark, Del.

[21] Appl. No.: 995,499

[22] Filed: Dec. 23, 1992

[51] Int. Cl.⁵ .............................................. B23D 45/16

[52] U.S. Cl. .......................................... 30/377; 30/391

[58] Field of Search .................................. 30/375-377, 30/388, 390, 391; 125/13.01, 13.03

[56] References Cited

FOREIGN PATENT DOCUMENTS 1403722 1/1969 Fed. Rep. of Germany ........ 30/377
2533296 2/1977 Fed. Rep. of Germany ........ 30/377

*Primary Examiner*—Douglas D. Watts
*Attorney, Agent, or Firm*—Harness, Dickey & Pierce

[57] ABSTRACT

A portable circular saw includes motor-and-gear case pivotally supported on a guide shoe by a rear pivot mechanism for rotation about a transverse rear pivot axis, thus allowing for selective adjustment of the blade cutting depth on the opposite side of the shoe. In such an arrangement, the depth of cut setting is increased and decreased when the motor-and-gear case is rotated relative to the shoe in respective first and second directions, while an upper pivotal blade guard, which is mounted on the motor-and-gear case for rotation about the spindle, rotates in opposite rotational directions in response to respective increases and decreases in the depth of cut setting. Cam and cam follower mechanisms are provided for maintaining the riving knife and the blade and shoe in the same relative angular orientation in a fore-and-aft cutting plane regardless of the depth of cut setting. Such riving knife actuation is accomplished by such mechanisms in response to the rotation of the rear-pivoted motor-and-gear case and the corresponding opposite rotation of the front-pivoted upper gear case.

29 Claims, 5 Drawing Sheets

RIVING KNIFE DRIVE MECHANISM FOR A PORTABLE CIRCULAR SAW

BACKGROUND AND SUMMARY OF THE INVENTION

The invention relates generally to portable circular saws having riving knives positioned in a rearward aft location relative to the cutting blade and adapted to extend into the saw kerf. Such riving knives are configured to substantially prevent the severed portions of the cut workpiece from moving toward one another and pinching the blade, thus creating undesirable drag on the saw blade. More particularly, the present invention relates to a drive mechanism for a movable riving knife that maintains a constant angular orientation or radial clearance relative to the saw blade, and a constant depth projection relative to the saw blade, regardless of the adjusted depth of cut of the saw blade. Preferably, the fore-and-aft location of the riving knife and the distance between the lower, free end of the riving knife and a lower tangent of the cutting blade parallel to the guide shoe are also maintained, regardless of the depth of cut setting. In particular, the present invention is especially adapted for applications in portable circular saws having a rear-pivoting motor-and-gear cases.

Riving knives, which are also sometimes called "splitters", have been provided in a variety of sawing or cutting apparatuses in order to keep the kerf open between severed portions of a workpiece, thereby substantially preventing the kerf from closing and allowing the workpiece portions to pinch the cutting blade. Such riving knife applications have included stationary and portable circular saws.

In the portable circular saw applications, precise control of the riving knife position has frequently presented a problem in that the angular orientation and fore-and-aft location have been difficult to control in response to depth-of-cut adjustments of the saw blade relative to the guide shoe. In order to overcome these problems, various mechanisms, including four-bar linkages, sometimes called "parallelogram linkage arrangements", have been provided in order to impart the desired relative motion to the riving knife to maintain the orientation of the riving knife relatively constant during depth-of-cut adjustment.

Such four-bar linkage arrangements for riving knife drive mechanisms in portable circular saws have suffered the disadvantage of being non-linear in terms of their response to depth-of-cut adjustments, thus making precise control of the riving knife position and orientation difficult. They have also been found to introduce unacceptable "play" into the riving knife motion, due to the tolerances required for relative motion of the various linkage members in such four-bar linkage arrangements. Such previous mechanisms also frequently involve an inordinately large number of parts, thus complicating the manufacture, assembly, and operation of the mechanisms, as well as not being sturdy enough to withstand the rough treatment to which such portable circular saws are frequently subjected in construction operations.

Therefore, some of the objects of the present invention include providing a riving knife drive mechanism capable of relatively linear, precise control of the riving knife position and orientation in response to cutting depth adjustment, a sturdier and more rigid riving knife drive mechanism, when compared to traditional four-bar linkage arrangements, a smoother-acting riving knife drive mechanism, and a relatively simple drive mechanism having a relatively low number of parts, thus facilitating the ease and economy of manufacture, assembly, and operation of the mechanism.

According to the present invention, a portable circular saw includes a guide shoe having a forward or fore end and a rear or aft end, and a motor-and-gear case disposed on one side of the guide shoe, with a transverse output spindle on the motor-and-gear case for supporting a cutting blade in a fore-and-aft cutting plane. The motor-and-gear case is pivotally supported on the shoe by a rear pivot mechanism for rotation about a transverse rear pivot axis, thus allowing for selective adjustment of the blade cutting depth on the opposite side of the shoe. In such an arrangement, the depth of cut setting is increased and decreased when the motor-and-gear case is rotated relative to the shoe in respective first and second directions, while an upper pivotal blade guard, which is mounted on the motor-and-gear case for rotation about the spindle, rotates in opposite rotational directions in response to respective increases and decreases in the depth of cut setting.

The preferred circular saw also includes a drive link pivotally connected to the guard, preferably at a location between the spindle and the rear pivot mechanism, a riving knife interconnected with the saw for pivotal rotation about the spindle, and cam-and-follower means interconnecting the shoe, the guard, the case, and the riving knife for rotating the guard in the first and second rotational directions when the depth of cut setting is decreased and increased, respectively, and for maintaining the riving knife and the shoe in the same relative angular orientation in the fore-and-aft cutting plane regardless of the depth of cut setting.

In the preferred riving knife drive arrangement, which is discussed in detail below and depicted for purposes of illustration in the drawings, a first cam surface and cam follower mechanism is interconnected between the shoe and the guard for rotating the guard about the spindle in response to depth of cut setting adjustments. A second cam surface and cam follower mechanism is interconnected between the riving knife and the drive link, and a third cam surface and cam follower mechanism is interconnected between the gear case and the drive link. The second and third cam surface and cam follower mechanisms maintain the riving knife in the same orientation relative to the shoe regardless of the depth of cut setting. Preferably, the location of the riving knife in the fore-and-aft direction is also maintained regardless of cutting depth setting, as is the distance between the free end of the riving knife and a lower tangent to the cutting blade.

Additional objects, advantages, and features of the present invention will become apparent from the following description and the appended claims, taken in conjunction with the accompanying drawings.

DETAILED DESCRIPTION OF THE PREFERRED EMBODIMENTS

Figure 1:
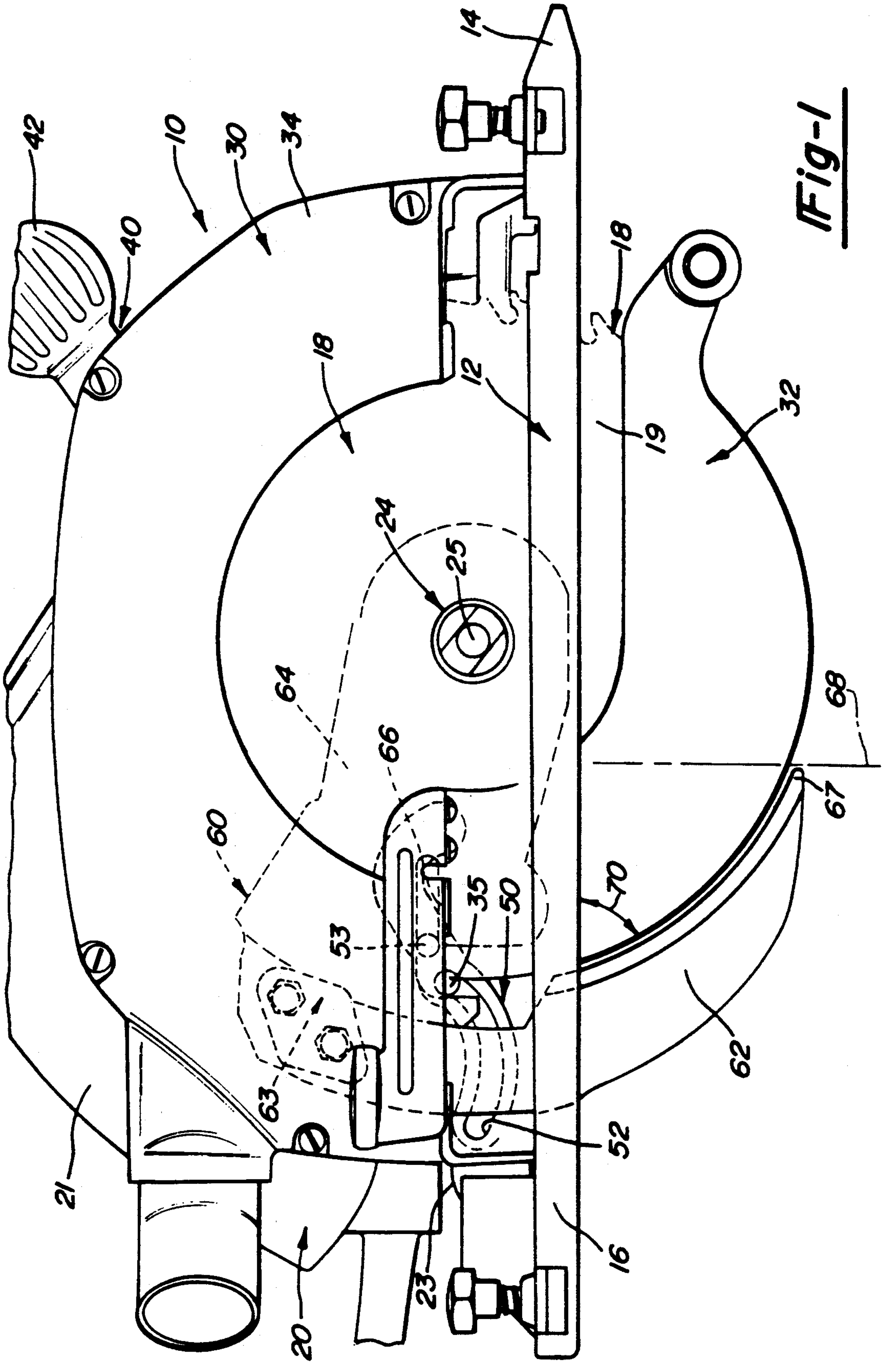
FIG. 1 is a right side view of an exemplary portable circular saw according to the present invention, with the saw set for a maximum cutting depth.
Figure 2:
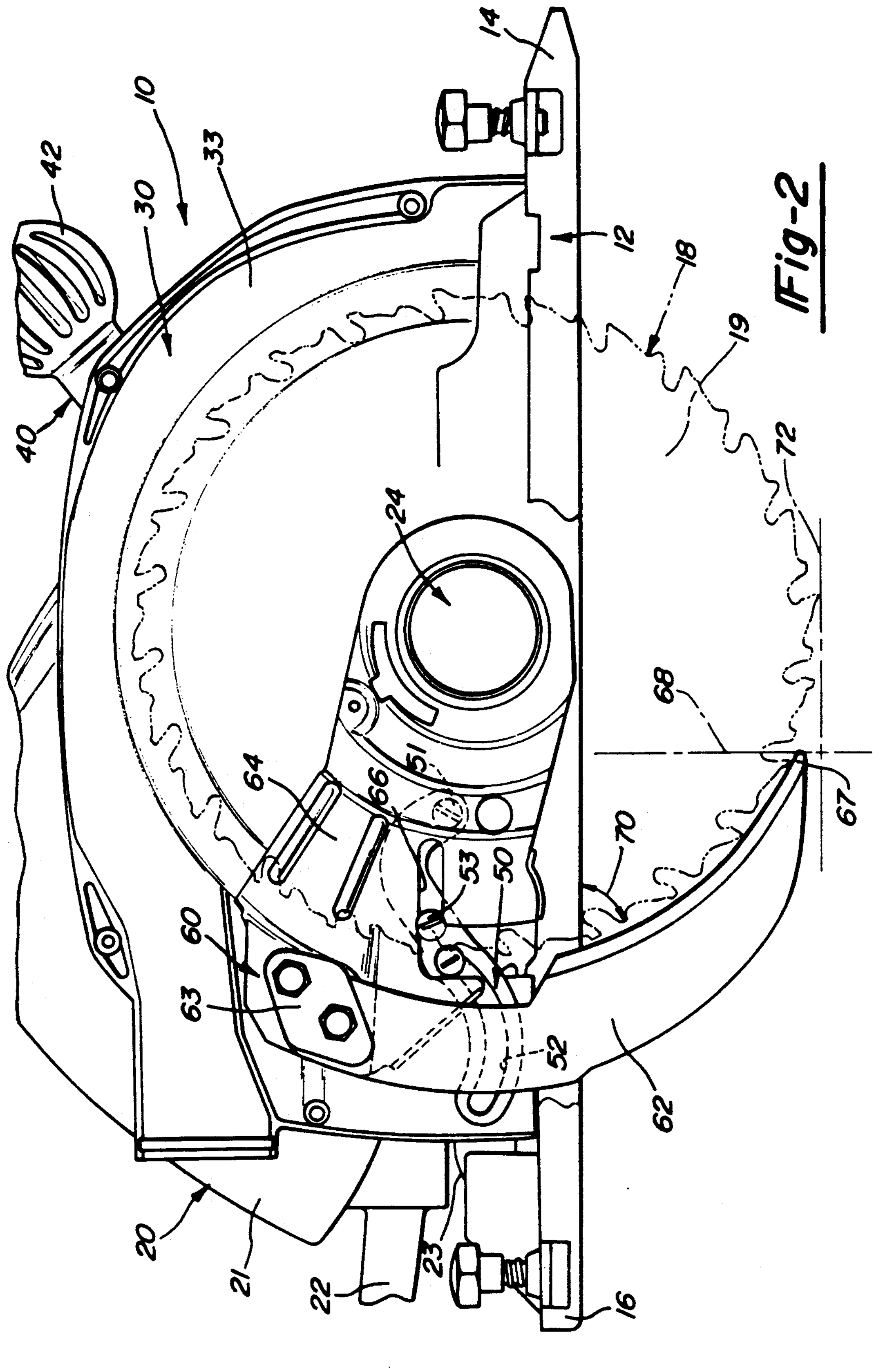
FIG. 2 is a view similar to that of FIG. 1, with the saw also adjusted for a maximum depth of cut, but with the lower blade guard and the outer half of the upper blade guard removed for clarity in order to illustrate various internal components.
Figure 3:
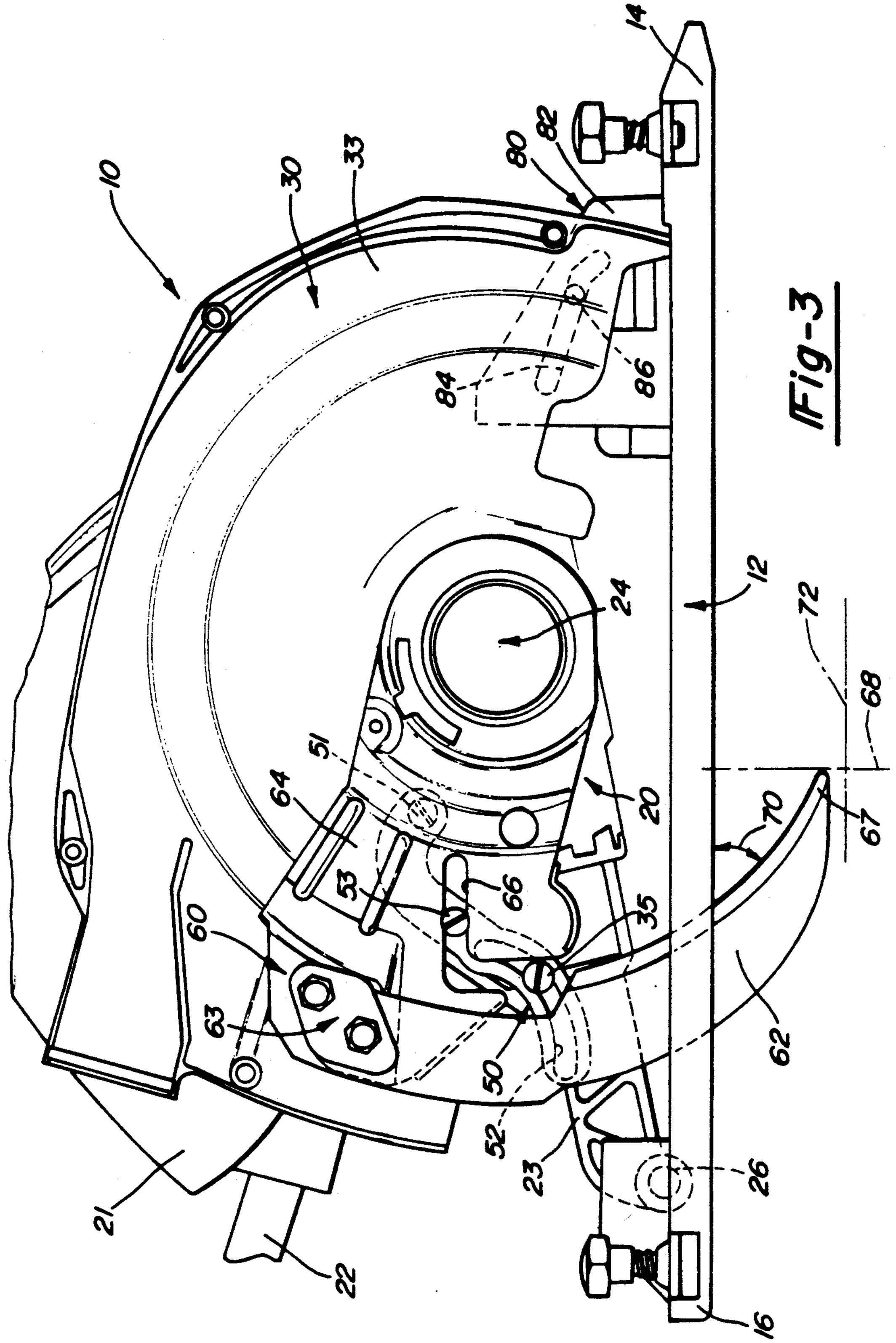
FIG. 3 is a view similar to that of FIG. 2, but with the saw adjusted for a shallower depth of cut.
Figure 4:
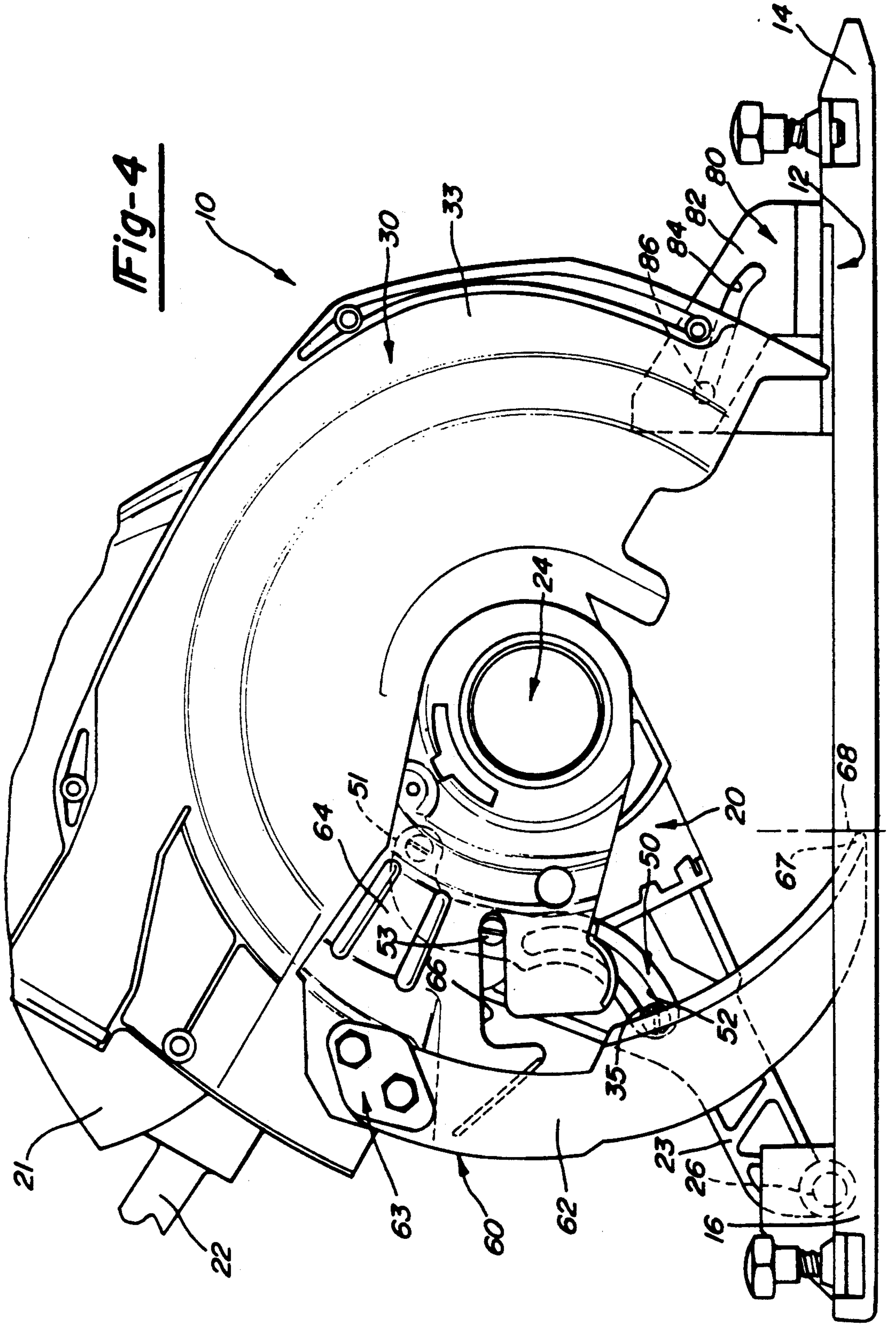
FIG. 4 is a view similar to that of FIGS. 2 and 3, but with the portable circular saw adjusted for a minimum depth of cut, wherein the blade would barely project from the guide shoe.
Figure 5:
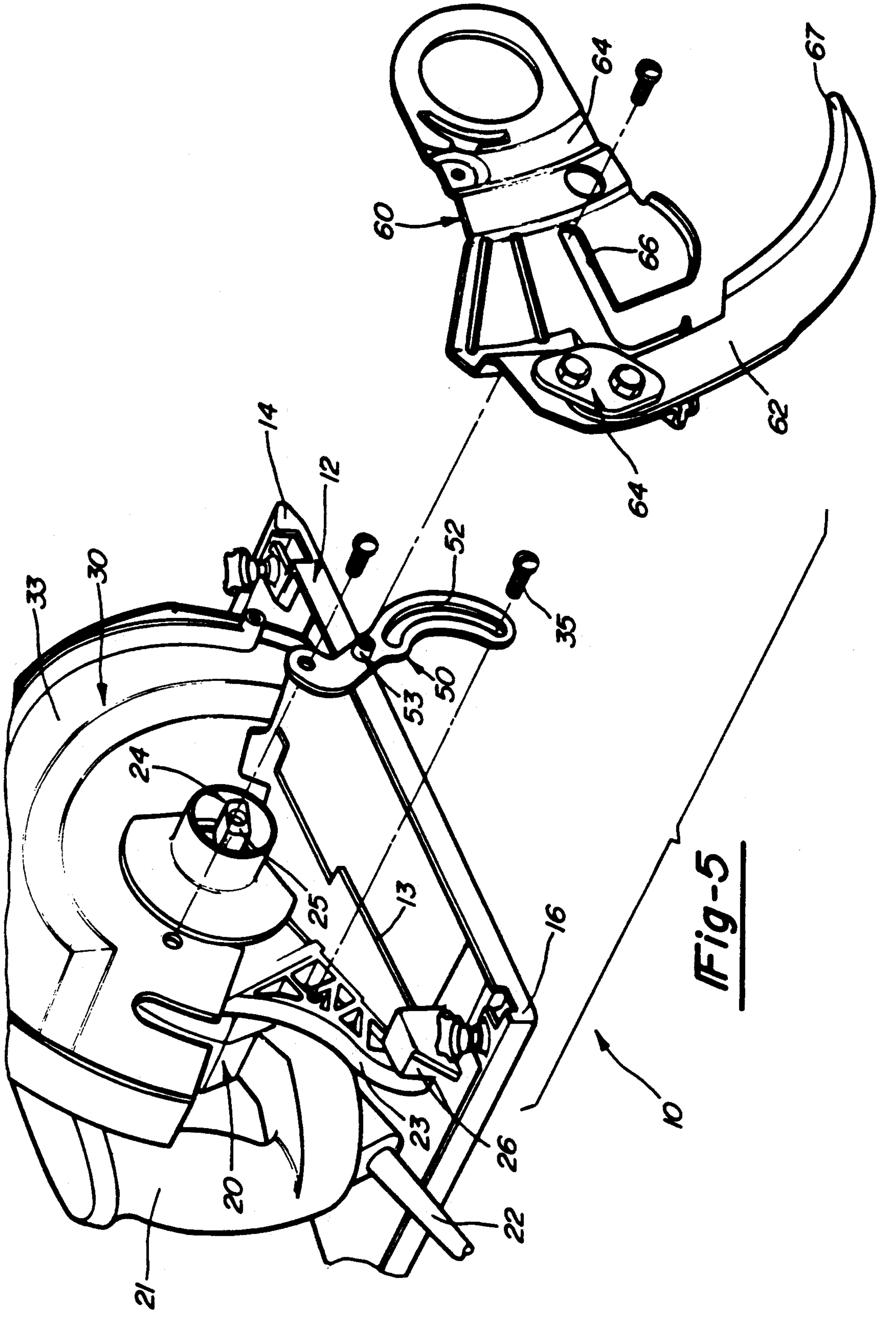
FIG. 5 is a partial exploded view of the exemplary portable circular saw of FIGS. 1 through 4, with the riving knife, riving knife carrier, and drive link components disassembled for purposes of illustration.

For purposes of illustration of one preferred embodiment of the invention, FIGS. 1 through 5 depict an exemplary portable circular saw 10, equipped with a riving knife drive arrangement according to the present invention. It should be noted, however, as will become readily apparent to those skilled in the art, that the present invention is equally applicable to other types of saws or cutting devices, as well as to portable circular saws other than that shown for purposes of illustration in the drawings.

The portable circular saw 10 generally includes a guide shoe 12 extending from the front or fore end 14 of the saw to the rear or aft end 16 of the saw 10. The guide shoe 12 includes an opening 13 (see FIG. 5), through which a cutting blade 18 extends. The cutting blade 18 is supported on a spindle 25 for rotation in a fore-and-aft-extending cutting plane 19 about a spindle assembly 24 on a motor-and-gear case 20. The motor-and-gear case 20 generally includes a handle 21, a power supply 22, and a pivot arm member 23, pivotally attached to the guide shoe 12 by way of a rear pivot 26. Such pivotal attachment accommodates selective cutting depth adjustment, an example of which is described in more detail in U.S. Pat. No. 4,982,501, issued Jan. 8, 1991, to William D. Sauerwein, et al. Such patent is assigned to the same assignee as the present invention and is hereby incorporated by reference herein.

An upper guard 30 is mounted for rotation on the spindle assembly 24, as well as being pivotally interconnected with the shoe 12 by way of a front pivot assembly 80. The front pivot assembly 80, perhaps best shown in FIGS. 3 and 4, includes a front pivot link 82, with an elongated slot 84 forming a camming surface therein. A pin or cam 86, which is fixedly attached to the upper guard 30, is slidably received within the slot or camming surface 84 formed in the front link 82.

By way of the clamping assembly 40, which includes a clamping knob 42, the cutting depth of the blade 18 can be set and maintained by loosening the clamping knob 42, to facilitate pivoting the motor-and-gear case 20 about the rear pivot mechanism 26 in first or second clockwise directions in order to respectively increase or decrease the depth of cut setting. In response to this pivotal adjustment, the upper guard 30 rotates in the opposite direction about the spindle assembly 24, that is, in first or second rotational directions in response to decreasing or increasing the depth of cut setting, respectively.

In FIGs. 2 through 5, the lower guard 32 and the outer half 34 of the upper guard 30 have been removed, leaving only the inner half 33 of the upper guard 30, in order to illustrate other internal components of the riving knife drive mechanism.

The riving knife drive mechanism includes a drive link 50, pivotally attached by way of a pivot pin 51 to the upper guard 30 and having a slot or camming surface 52 formed therein, which slidably receives a cam follower or pin 35 on the pivot arm member 23 of the motor-and-gear case 20. The drive link 50 also includes a cam follower or pin 53 fixedly attached thereto, the purpose of which will be explained below.

A riving knife assembly 60 includes a riving knife 62 connected by way of an adjusting mechanism 63 to a riving knife carrier 64, which is in turn disposed for rotational pivotal motion about the spindle assembly 24. The adjusting mechanism 63 is adapted to releasably hold the riving knife 62 in a fixed position and orientation with respect to the riving knife carrier 64, but provides for a relatively small amount of adjustment therebetween in order to accommodate cutting blades of slightly different sizes or cutting blades whose outer diameters have changed slightly due to repeated sharpenings. Ordinarily, however, the adjusting mechanism 63 fixedly retains the riving knife 62 in a fixed position and orientation relative to the riving knife carrier 64. The riving knife 62 also includes a free end 67, which is disposed below the guide shoe 12, and the riving knife carrier 64 includes a slot or camming surface 66 formed therein, in which the above-mentioned cam follower or pin 53 on the drive link 50 is slidably received.

By way of the slidable engagements of the above-described camming surfaces and their respective cam followers or pins, the riving knife 62 is moved in response to depth-of-cut adjustments in order to maintain the riving knife 62 in a substantially constant orientation relative to the blade 18 and the guide shoe 12 in a fore-and-aft plane, regardless of the selected depth-of-cut setting. Such driving actuation of the riving knife 62 is accomplished in response to the pivotal motion of the motor-and-gear case 20 about the rear pivot 26 and the corresponding opposite pivotal motion of the upper guard assembly 30 about the sliding front pivot assembly 80.

When the depth of cut is selectively adjusted, the upper guard assembly 30 pivots about the spindle assembly 24, and the pin or cam follower 86 on the upper guard assembly 30 slides and pivots within the elongated slot or camming surface 84 of the front link 82 in order to accommodate the pivotal movement of the motor-and-gear case 20 about the rear pivot 26.

When the upper guard assembly 30 rotates, the drive link 50 pivots about the pivot pin 51 fixedly mounted on the upper guard assembly 30. At the same time, the generally arcuate slot or camming surface 52 of the drive link 50 slidably engages the camming surface or pin 35 fixedly mounted on the pivot arm member 23 of the motor-and-gear case 20. This causes movement of the cam follower or pin 53 on the drive link 50 within the slot or camming surface 66 of the riving knife carrier 64. The combination of these motions, which are imparted to the riving knife carrier 64 by the cam follower or pin 53, causes the riving knife carrier 64 and the riving knife 62 to move along a predetermined locus toward and away from the guide shoe 12, thus maintaining the desired orientation of the riving knife 62 with respect to the blade 18 and the guide shoe 12.

Preferably, the fore-and-aft location 68 of the free end 67 on the riving knife 62 is maintained, regardless of the depth-of-cut setting, as are the angular orientation 70 of the riving knife 62 relative to the guide shoe 12 and the distance between the free end 67 of the riving knife 62 and the lower tangent 72 on the adjusted blade 18, with such tangent 72 being substantially parallel to the guide shoe 12.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

We claim:

1. A portable circular saw comprising:

a guide shoe having a forward end and a rearward end;

a motor-and-gear case disposed on one side of the shoe and having a transverse output spindle for supporting a blade in a fore-and-aft cutting plane;

a rear pivot for pivotally supporting the motor-and-gear case on the shoe for rotation about a transverse rear pivot axis and for adjusting the extension of the blade on the opposite side of the shoe in order to thereby adjust the depth of cut setting of the blade, the depth of cut setting being increased and decreased when the motor-and-gear case is rotated relative to the shoe in first and second rotational directions, respectively;

an upper blade guard pivotably mounted on the motor-and-gear case for rotation about the spindle;

a drive link pivotally connected to the guard at a location between the spindle and rear pivot;

a riving knife interconnected for pivotal rotation about the spindle; and cam-and-follower means interconnecting the shoe, the guard, the case, and the riving knife for rotating the guard in the first and second rotational directions when the depth of cut settings is decreased and increased, respectively, and for maintaining the riving knife and the shoe in the same relative angular orientation in fore-and-aft cutting plane regardless of the depth of cut setting.

2. A portable circular saw according to claim 1, wherein the cam-and-follower means comprises:

a first cam surface and cam follower mechanism interconnected between the shoe and the guard for rotating the guard about the spindle in the first and second rotational directions when the depth of cut setting is descreased and increased, respectively;

a second cam surface and cam follower mechanism interconnected between the riving knife and the drive link;

a third cam surface and cam follower mechanism interconnected between the gear case and the drive link; and the second and third cam surface and cam follower mechanisms maintaining the riving knife in the same orientation relative to the shoe regardless of the depth of cut setting.

3. A portable circular saw according to claim 2, wherein a first cam surface is interconnected with the shoe and extends generally in the fore-and-aft direction, and a first cam follower extends transversely from the guard.

4. A portable circular saw according to claim 2, wherein a second cam surface is interconnected with the riving knife and extends generally in the fore-and-aft direction, and a second cam follower is fixed to and extends transversely from the drive link.

5. A portable circular saw according to claim 2, wherein a third cam surface is formed in the drive link and extends generally in the fore-and-aft direction, and a third cam follower is fixed to and extends transversely from the case.

6. A portable circular saw according to claim 2, wherein the first cam surface and cam follower mechanism is located forward of the spindle, the pivotal connection between the drive link and the guard being located rearwardly of the spindle, the second cam surface and cam follower mechanism being located rearwardly of the pivotal connection between the drive link and the guard, the third cam surface and cam follower mechanism being located rearwardly of the second cam surface and cam follower mechanism, and the rear pivot being located rearwardly of the third cam surface and cam follower mechanism.

7. A portable circular saw according to claim 1, further comprising a riving knife carrier, said carrier being pivotally mounted at a first end about the spindle and having the riving knife fixed thereto at a second opposite end.

8. A portable circular saw comprising:

a guide shoe having a forward end and a rearward end;

a motor-and-gear case disposed on one side of the shoe having a transverse output spindle for supporting a blade in a fore-and-aft cutting plane;

a rear pivot for pivotally supporting the motor-and-gear case on the shoe for rotation about a transverse rear pivot axis and for adjusting the extension of the blade on the opposite side of the shoe in order to thereby adjust the depth of cut setting of the blade, the depth of cut setting being increased and decreased when the motor-and-gear case is rotated relative to the shoe in first and second rotational directions, respectively;

an upper blade guard pivotably mounted on the motor-and-gear case for rotation about the spindle and pivotably mounted and slidably interconnected with the shoe;

a riving knife interconnected for pivotal rotation about the spindle;

a drive link pivotally connected to the guard, pivotably and slidably interconnected with the riving knife, and pivotably and slidably interconnected with the case; and said drive link maintaining the knife and shoe in the same relative angular orientation in the fore-and-aft cutting plane regardless of the depth of cut setting.

9. A portable circular saw according to claim 8, further comprising a riving knife carrier pivotably mounted about the spindle at one carrier end and having the riving knife fixed thereto at a second carrier end opposite the first carrier end;

the connection between the drive link and riving knife being formed by a slot formed in the carrier and a transverse pin fixed to the drive link, said slot extending generally in the fore-and-aft direction.

10. A portable circular saw according to claim 8, wherein the connection between the motor-and-gear case and the drive link is formed by a slot in the drive link and a transverse pin fixed to the motor-and-gear case.

11. A portable circular saw according to claim 8, wherein the guard is rotated in said first and second rotation directions when the depth of cut is decreased and increased, respectively.

12. A portable circular saw according to claim 1, wherein said cam-and-follower means maintains a constant distance regardless of the depth of cut setting between a free end of said riving knife on a distal side of the shoe opposite the motor-and-gear case and a tangent to the blade on said distal side of the shoe, said tangent being generally parallel to the shoe.

13. A portable circular saw having: a motor-and-gear case for supporting a cutting blade rotatable about a blade spindle in a fore-and-aft cutting plane; a shoe extending transverse to the cutting plane fore and aft of the blade spindle and having a shoe opening therethrough for receiving the cutting blade extending therethrough; rear pivot means aft of the blade spindle pivotally interconnecting the motor-and-gear case with the shoe for adjustably increasing and decreasing the cutting depth by which the cutting blade extends through the shoe opening in response to selective pivoting of the motor-and-gear case in respective first and second rotational directions about said rear pivot means; an upper blade guard pivotally mounted for rotation about the blade spindle, guard linkage means disposed forward of the blade spindle for pivoting the upper blade guard in response to, but in an opposite pivotal direction from, said selective pivoting of the motor-and-gear case; and a riving knife assembly, said riving knife assembly including a drive link pivotally interconnected with the upper blade guard, a riving knife carrier pivotally mounted for rotation about the blade spindle, a riving knife connected to said riving knife carrier, carrier cam-and-follower means interconnecting said riving knife carrier and said drive link, drive cam-and-follower means interconnecting said drive link and the motor-and-gear case, said carrier and drive cam-and-follower means maintaining said riving knife in the same orientation relative to the shoe and the cutting blade regardless of the adjusted cutting depth.

14. A portable circular saw according to claim 13, wherein said carrier and drive cam-and-follower means maintain a constant distance regardless of the depth of cut setting between a free end of said riving knife on a distal side of the shoe opposite the motor-and-gear case and a tangent to the blade on said distal side of the shoe, said tangent being generally parallel to the shoe.

15. A portable circular saw according to claim 13, wherein said riving knife also extends through the show opening, said carrier and drive cam-and-follower means also causing the extent to which the riving knife extends through the shoe opening to increase and decrease, respectively, in response to adjusted increases and decreases of the cutting depth, said carrier and drive cam-and-follower means maintaining said riving knife in a constant angular orientation and a constant fore-and-aft orientation relative to the shoe and the cutting blade regardless of the adjusted increases and decreases of the cutting depth and regardless of the corresponding increases and decreases in the extent to which said riving knife extends through the shoe opening.

16. A portable circular saw according to claim 15, wherein said carrier cam-and-follower means includes a carrier cam surface on said riving knife carrier and a carrier follower on said drive link.

17. A portable circular saw according to claim 16, wherein said carrier cam surface is defined by an elongated carrier slot formed in said riving knife carrier and extending generally in the fore-and-aft direction.

18. A portable circular saw according to claim 17, wherein said carrier follower is a transverse carrier pin mounted on said drive link and slidably received in said carrier slot.

19. A portable circular saw according to claim 15, wherein said drive cam-and-follower means includes a drive cam surface on said drive link and a drive follower on said motor-and-gear case.

20. A portable circular saw according to claim 19, wherein said drive cam surface is defined by an elongated generally arcuate drive slot formed in said drive link and extending generally in the fore-and-aft direction.

21. A portable circular saw according to claim 20, wherein said drive follower is a transverse drive pin mounted on the motor-and-gear case and slidably received in said drive slot.

22. A portable circular saw according to claim 21, wherein said drive pin is' mounted on a pivot arm portion of the motor-and-gear case.

23. A portable circular saw according to claim 15, wherein said carrier and drive cam-and-follower means are located between said pivot and said blade spindle.

24. A portable circular saw according to claim 16, wherein said drive cam-and-follower means includes a drive cam surface on said drive link and a drive follower on said motor-and-gear case.

25. A portable circular saw according to claim 17, wherein said drive cam surface is defined by an elongated arcuate drive slot formed in said drive link and extending generally in the fore-and-aft direction.

26. A portable circular saw according to claim 18, wherein said drive follower is a transverse drive pin mounted on the motor-and-gear case and slidably received in said drive slot.

27. A portable circular saw according to claim 26, wherein said drive pin is mounted on a pivot arm portion of the motor-and-gear case.

28. A portable circular saw according to claim 27, wherein said carrier and drive cam-and-follower means are located between said rear pivot and said spindle.

29. A portable circular saw according to claim 28, wherein said carrier and drive cam-and-follower means maintain a constant distance regardless of the depth of cut setting between a free end of said riving knife on a distal side of the shoe opposite the motor-and-gear case and a tangent to the blade on said distal side of the shoe, said tangent being generally parallel to the shoe.

* * * * *

UNITED STATES PATENT AND TRADEMARK OFFICE

CERTIFICATE OF CORRECTION

PATENT NO. : 5,235,752

DATED : August 17, 1993

INVENTOR(S) : William D. Sauerwein et al.

It is certified that error appears in the above-identified patent and that said Letters Patent is hereby corrected as shown below:

Column 7, line 48, claim 15,
"show" should be --shoe--.

Column 8, line 33, claim 23,
after "said" (first occurrence), insert --rear--.

Column 8, line 51, claim 28,
after "said" (second occurrence), insert --blade--.

Signed and Sealed this

Twenty-second Day of March, 1994

*Attest:*

Bruce Lehman

BRUCE LEHMAN

*Attesting Officer* *Commissioner of Patents and Trademarks*